US006992816B2

(12) United States Patent
Chung et al.

(10) Patent No.: US 6,992,816 B2
(45) Date of Patent: Jan. 31, 2006

(54) APPARATUS AND METHOD FOR GAIN-SPECTRUM-TILT COMPENSATION IN LONG-WAVELENGTH BAND DISPERSION-COMPENSATING HYBRID FIBER AMPLIFIER

(75) Inventors: Hee Sang Chung, Daejeon (KR); Won Kyoung Lee, Busan (KR); Sun Hyok Chang, Daejeon (KR); Hyun Jae Lee, Daejeon (KR); Moo Jung Chu, Daejeon (KR); Han Hyub Lee, Daejeon (KR); Dong Han Lee, Daejeon (KR); Yong Bae Lee, Daejeon (KR)

(73) Assignee: Electronics & Telecommunications Research Institute, (KR)

( * ) Notice: Subject to any disclaimer, the term of this patent is extended or adjusted under 35 U.S.C. 154(b) by 182 days.

(21) Appl. No.: 10/729,088

(22) Filed: Dec. 4, 2003

(65) Prior Publication Data

US 2005/0007656 A1    Jan. 13, 2005

(30) Foreign Application Priority Data

Jul. 9, 2003    (KR) ...................... 10-2003-0046491

(51) Int. Cl.
*H01S 3/00* (2006.01)

(52) U.S. Cl. ................................ 359/337.11
(58) Field of Classification Search ............. 359/337.1, 359/337.11, 337.5

See application file for complete search history.

(56) References Cited

U.S. PATENT DOCUMENTS

| 6,178,038 B1 | 1/2001 | Taylor et al. |
| 6,335,821 B1 * | 1/2002 | Suzuki et al. ........... 359/337.11 |
| 6,411,430 B1 * | 6/2002 | Ogino et al. ............ 359/337.11 |
| 6,888,670 B2 * | 5/2005 | Oh et al. .................... 359/334 |

FOREIGN PATENT DOCUMENTS

JP    2004103599 A *    4/2004

OTHER PUBLICATIONS

J. Nakagawa, et al.; 1580-nm Band Erbium-Doped Fiber Amplifier-Employing Novel Temperature Compensation Technique, Information Technology R&D Center, Mitsubishi Electric Corporation, Kamakura, Japan, 108-110.

* cited by examiner

*Primary Examiner*—Mark Hellner
(74) *Attorney, Agent, or Firm*—Blakely, Sokoloff, Taylor & Zafman

(57) ABSTRACT

The present invention provides an apparatus and method for compensating for the variation of a gain spectrum attributable to the temperature variation of a fiber amplifier, and a long-wavelength band dispersion-compensating hybrid amplifier equipped with the gain spectrum compensating apparatus. The apparatus includes a DCF located between a first amplification stage and a second amplification stage to compensate for dispersion of an optical signal output from the first amplification stage and perform Raman amplification of the optical signal using input pumping light; at least one pumping light provision means for providing forward or backward pumping light to the DCF; first and second temperature detection means for detecting temperature variations of the first and second amplification stages, respectively; and control means for controlling intensity of the pumping light of the pumping light provision means according to the detected temperature variations.

17 Claims, 8 Drawing Sheets

# APPARATUS AND METHOD FOR GAIN-SPECTRUM-TILT COMPENSATION IN LONG-WAVELENGTH BAND DISPERSION-COMPENSATING HYBRID FIBER AMPLIFIER

BACKGROUND OF THE INVENTION

1. Field of the Invention

The present invention is related to the optical fiber amplifiers used in the optical communication systems and, more specifically, to an apparatus and method for compensating for the gain-spectrum-tilt of a long-wavelength band dispersion-compensating hybrid amplifier due to an environmental temperature change, and a long-wavelength band dispersion-compensating hybrid fiber amplifier equipped with the gain-spectrum-tilt compensating apparatus.

2. Description of the Prior Art

In the optical communication using wavelength-division multiplexed (WDM) systems, a plurality of channels are transmitted simultaneously; the conventional band (C-band) of 1530 to 1565 nm, the long-wavelength band (L-band) of 1570 to 1605 nm, or both of them are normally used. In these systems, the optical signals become small through the transmission fibers and recover their launching powers by the optical amplifiers at the end of each span. However, the amplified signal qualities deteriorate due to the noises, mainly amplified spontaneous emission (ASE) noise. Therefore, it is desirable to minimize the ASE noises from the optical amplifiers for the successful signal transmission. Among various optical amplifiers the erbium-doped fiber amplifiers (EDFAs) are widely used in the WDM transmissions these days because of their good gain and noise characteristics. In principle, they can have noise figures close to the quantum limit, 3 dB, if designed well. Meanwhile, most high-speed core networks based on 2.5, 10, or 40 Gbit/s per channel require dispersion compensation to keep the transmitted channels from becoming distorted in time domain, where the dispersion-compensating fibers (DCFs) are normally used. Then, the extra losses of DCFs have to be compensated by the EDFAs, which, in turn, cause the decrease of optical signal-to-noise ratios (OSNRs) of the transmitted channels. An effective way to retain high OSNRs is to incorporate the DCF into the inter-stage of a two-stage EDFA. Though, the insertion of DCF raises the noise figure of the EDFA.

An effective method for solving such a problem is to use a dispersion-compensating hybrid fiber amplifier (DCHFA). This consists of a two-stage EDFA and an actively pumped DCF where the optical signals experience Raman amplification. Unlike the C-band DCHFA, however, the L-band DCFHA has a temperature-dependent gain-spectrum tilt, which comes from the inherent temperature dependences of the absorption and emission cross sections of erbium-doped fibers (EDFs).

FIG. 1 illustrates the variation of gain spectrum according to the temperature variation of the EDFs in a conventional two-stage L-band EDFA. The gain spectrum is flat over the signal wavelengths of the L-band at 25° C. However, the gain profiles become slanted with positive gain slopes at the lower temperatures, and vice versa at the higher temperatures.

There are a few known methods to suppress these gain tilts. First, keeping the temperature of the EDF coils constant is the easiest method. However, since this method needs thermal insulation, the complete EDFA module has to become more bulky, which is against the current tendency for compact size.

The other methods are related to the control of parameters that can affect the gain spectrum, i.e., the signal powers or pump powers. As an example, U.S. Pat. No. 6,335,821 discloses a method of measuring the temperature of an EDF using a temperature sensor and controlling the pump-driving currents according to the measured temperature. In this method, the pump powers in the EDFA to get a flat gain spectrum are set. Another example is to employ a variable optical attenuator (VOA) in a two-stage EDFA. The VOA can adjust the launching signal power into the second stage, which is usually in a deep saturation regime. Since the gain spectrum of a deeply saturated EDFA changes with the input signal power, the inter-stage VOA can adjust the overall gain-spectrum tilt.

In principle, keeping the temperature of an overall optical amplifier constant can fix the temperature-dependent gain tilts in an L-band DCHFA as well as an L-band EDFA. However, the size problem of a relatively bulky amplifier still remains. On the other hands, the methods of the parameter control cannot be directly applied to the DCHFA since it has the pumped DCF section where the Raman amplification process occurs. Understanding its impact on the overall gain spectrum of an L-band DCHFA under the temperature changes should be preceded to compensate accurately the gain-spectrum tilts.

SUMMARY OF THE INVENTION

The present invention provides an apparatus and method for compensating for the variation of the gain spectrum in an L-band DCHFA due to the variation of temperature by controlling the magnitude and slope of the Raman gain in the inserted DCF. In addition, the present invention provides an L-band DCHFA equipped with the gain-tilt compensating apparatus.

In order to accomplish the above object, the present invention provides an apparatus that consists of a two-stage optical amplifier and a DCF between each stage to compensate for the dispersion of the incoming high-speed modulated signals. At the same time, the DCF is optically pumped by pump laser diodes (LDs) to obtain Raman gains. It also includes; at least one pumping light provision means for forward or backward pumping light injection to the DCF, first and second temperature detection means for detecting the temperature variations of the first and second amplification stages, respectively; and control means for controlling the optical power of the pumping light of the pumping light provision means according to the detected temperature variations, wherein the variation of the gain spectrum of the optical fiber amplifier is compensated by controlling the intensity of the pumping light.

In an embodiment of the present invention, the apparatus may further include at least one means to reduce the degree of polarization of the pumping light. This can be done, for example, by the use of a depolarizer or a polarization-beam combiner. Both can suppress the polarization dependence of the Raman gain in the DCF.

In addition, the present invention provides a method of compensating for the variation of the gain spectrum due to the temperature variation of the optical fiber amplifier that has a two-stage structure, which includes the steps of detecting the temperature of the first and second amplification stages, controlling the optical power of pumping light inputted to the DCF located between them, and thereby controlling the Raman gain.

In an embodiment of the present invention, the step of controlling the Raman gain may include the step of providing at least one of forward or backward pumping light.

Additionally, the step of controlling the intensity of the pumping light may includes the step of reducing the degree of polarization of the pumping light of a wavelength of 1500±10 nm inputted to the DCF.

In addition, the present invention provides an L-band DCHFA, including a first amplification stage for first amplifying an input optical signal using first pumping light; dispersion-compensating Raman amplification means both for compensating for dispersion of the optical signal and performing Raman amplification of the first amplified optical signal using second pumping light; a second amplification stage for second amplifying the optical signal from the dispersion-compensating Raman amplification means using third pumping light; first and second temperature detection means for detecting temperature variations of the first and second stages, respectively; and control means for controlling intensity of the second pumping light according to the detected temperature variations of the first and second amplification stages; wherein the variation of the gain spectrum of the optical fiber amplifier due to the variation of temperature is compensated by controlling the intensity of the Raman-pumping light.

In an embodiment of the present invention, the input optical signal may have a wavelength of 1570 to 1605 nm, and the Raman pumping light may have a wavelength of 1500±10 nm.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
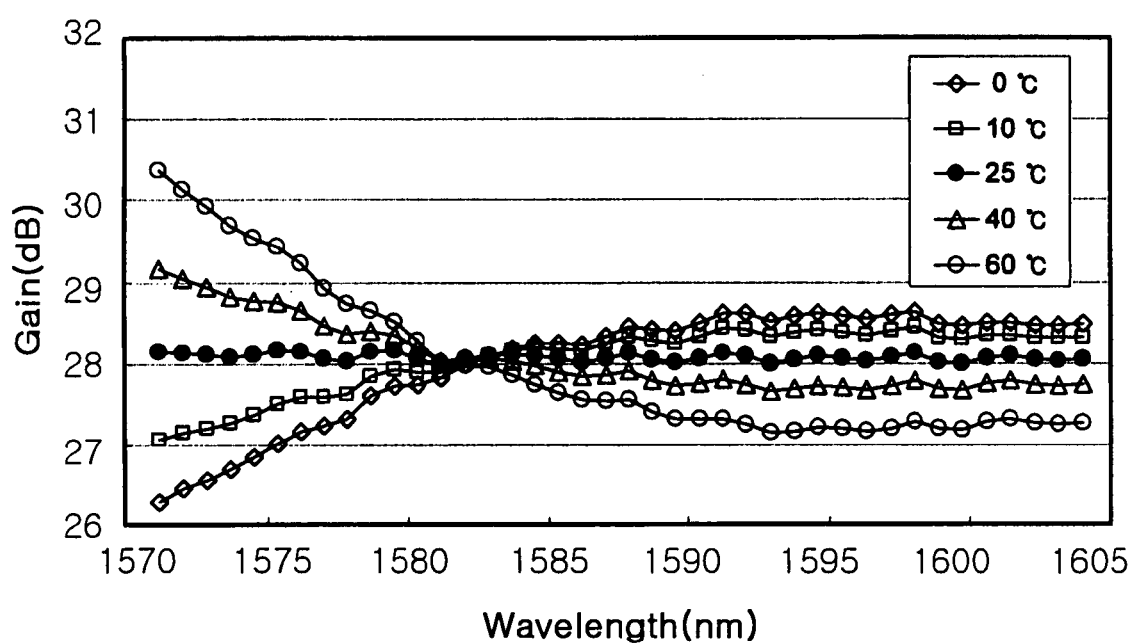
FIG. 1 is a graph showing the variation of gain spectrum according to the variation of the temperature of the EDFs in a conventional L-band EDFA.

Reference now should be made to the drawings, in which the same reference numerals are used throughout the different drawings to designate the same or similar components.

A preferred embodiment of the present invention is described in detail with reference to the accompanying drawings.

Figure 2:
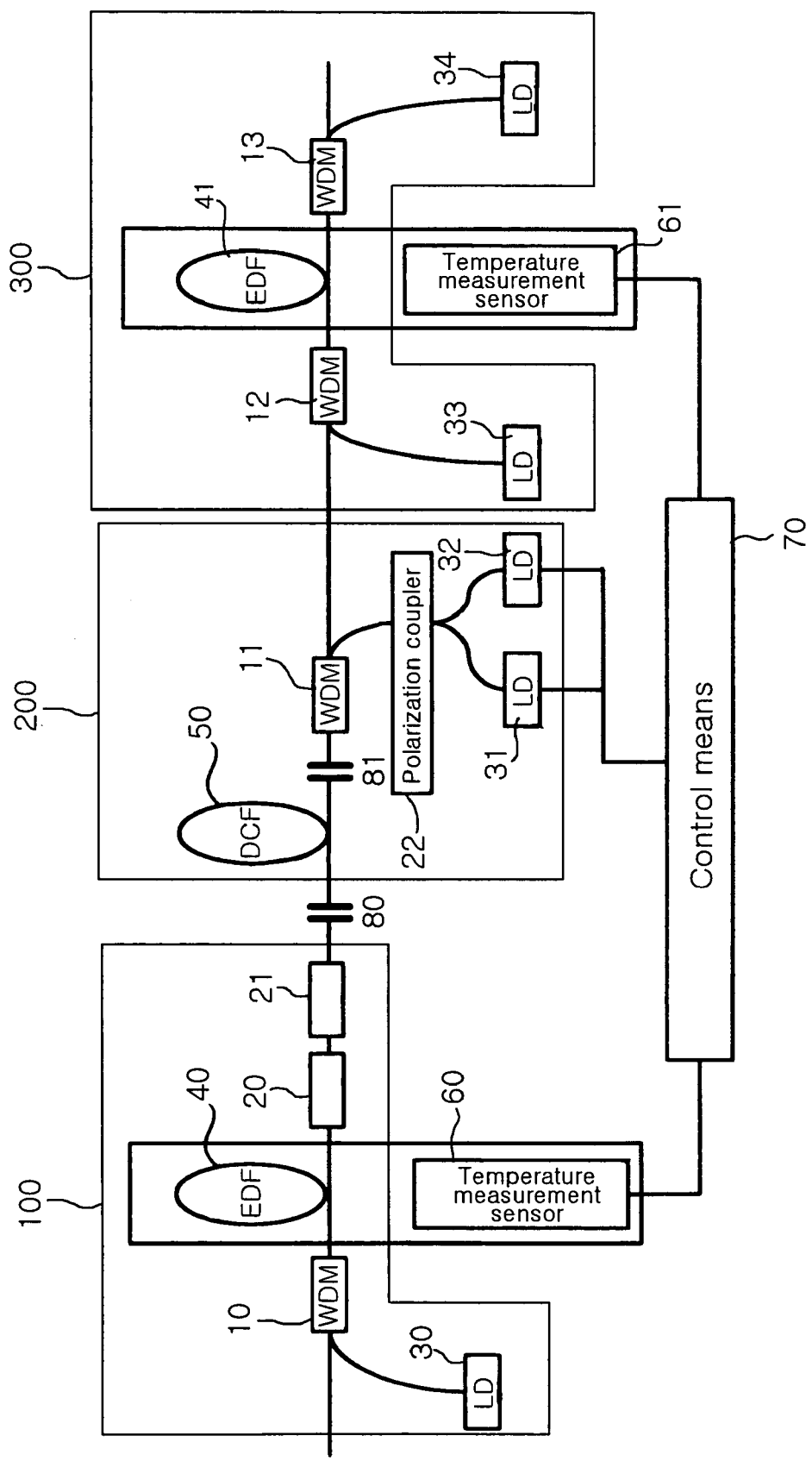
FIG. 2 is a configuration diagram of an L-band DCHFA equipped with a gain-spectrum-tilt compensating apparatus in accordance with an embodiment of the present invention.

FIG. 2 is a configuration diagram of an L-band DCHFA equipped with a gain-tilt compensating apparatus in accordance with an embodiment of the present invention. The configuration shown in the drawing is an example of the gain-tilt compensating apparatus applied to an optical fiber amplifier and the L-band DCHFA equipped with the gain-tilt compensating apparatus. Reference numerals 10 to 13 designate wavelength-division multiplexers (WDMs), which combine the L-band optical signals and pumping light into a single optical fiber. In this case, reference numeral 10 preferably designates a WDM that combines 980-nm pumping light with the L-band signals and reference numerals 11 to 13 preferably designate WDMs that combine 1480 to 1500-nm pumping light with the L-band signals. Reference numerals 20 to 22 designate passive components, in which reference numeral 20 designates an optical isolator for suppressing the reflection of the signal, reference numeral 21 designates a gain equalizing filter for equalizing gains over the signal bandwidth, and reference numeral 22 designates a polarization-beam combiner for combining two pumping lasers of the same wavelength. Reference numerals 30 to 34 designate pumping LDs, in which reference numeral 30 designates a 980-nm LD for supplying pump energy to the first amplification stage 100, reference numerals 31 and 32 designate 1500-nm LDs used for the Raman amplification in a DCF, and reference numerals 33 and 34 designate 1480-nm LDs for supplying pump energy in the second amplification stage 300. Reference numerals 40 and 41 designate EDFs, which are gain media allowing gain to be achieved in the first and second amplification stage. Reference numeral 50 designates the DCF used to compensate for the dispersion of the optical signal from the first amplification stage 100, which is also the Raman gain medium. Reference numerals 60 and 61 designate temperature measurement sensors that detect the temperatures of the EDFs 40 and 41, respectively. Reference numeral 70 designates a control means that controls the driving currents for 1500-nm LDs 31 and 32 based on the temperatures detected by the temperature measurement sensors 60 and 61. The control means 70 controls the Raman gain in the DCF 50 by controlling the intensity of the pumping light of the 1500-nm LDs 31 and 32 and, thus, compensates for the variation of the gain spectrum of the overall optical amplifier that comes from the variation of the environmental temperature. Reference numerals 80 and 81 designate optical connectors that connect the first amplification stage 100 to the DCF 50 and the DCF 50 to the second amplification stage 300, respectively.

With reference to the preferred embodiment of the present invention shown in FIG. 2, the operations of the gain-tilt compensating apparatus and the L-band DCHFA equipped with the apparatus according to the variation of temperature are described below. Although, in this drawing, the L-band DCHFA has been illustrated as an embodiment of the present invention, the gain-tilt compensating apparatus of the present invention may be applied to various types of two-stage fiber amplifiers.

The fiber amplifier of the present invention has a two-stage amplification structure. The WDM 10 of the first amplification stage 100 receives the L-band optical signal and forward pumping light provided by the first LD 30, and couples them into the first EDF 40. The first LD 30 provides 980-nm pumping light to the WDM 10, and the first EDF 40 is a medium that allows gain to be achieved in the first amplification stage 100. The optical signal passed through the EDF 40 is inputted to the DCF 50 located in the dispersion-compensating Raman amplification means 200 through an optical isolator 20 for suppressing the reflection of the signal and the gain-equalizing filter 21 for equalizing gain over the signal bandwidth.

The operation of the dispersion-compensating Raman amplification means 200 is described below. The WDM 11 receives the L-band optical signal to pass it through the next stage 300, and also receives the backward pumping light in the wavelength range of 1500±10 nm provided by at least one of the LDs 31 and 32 to couple it into the DCF 50. The backward pumping light preferably has a 1500-nm wavelength. Although two LDs 31 and 32 are illustrated in the drawing as an example, one or more LDs may be installed to provide the pumping light. In the case where two LDs 31 and 32 are provided as shown in the drawing, the polarization-beam combiner 22 is provided so that they are combined with orthogonal polarization directions each other. This polarization-beam combining is to reduce the pump-polarization dependence of the Raman amplification in the DCF 50. As another embodiment, a depolarization means may be provided to reduce the degree of polarization of the pumping light. A fiber-type depolarizer may be an example of the depolarization means. Furthermore, although the backward pumping light is illustrated as being provided to the DCF 50, it is also possible to provide the forward pumping light to the DCF 50 in another embodiment of the present invention.

The Raman gain in the DCF 50 is obtained by controlling the LDs 31 and 32. That is, by controlling the intensity of the pumping light provided by the LDs 31 and 32, the Raman gain in the DCF 50 can be varied.

Thereafter, the WDM 12 of the second amplification stage 300 receives the L-band signal and forward pumping light provided by the LD 33, and couples them into the second EDF 41. The LD 33 provides 1480-nm pumping light to the gain medium, EDF 41 via the WDM 12, and allows the signal gain to be achieved in the amplification stage 300. The second amplification stage 300, as depicted in the drawing, is provided with another pumping LD 34, so that the second amplification stage 300 is constructed to enable the forward, backward or bi-directional provision of the pumping light.

The EDF 40 to which the present invention is applied has an appropriate length that allows a gain that is equal to or higher than at least 8 dB over the whole L-band to achieve low noise figures of the whole DCHFA. The DCF 50 has a length that allows the dispersion compensation of single-mode fiber, non-zero dispersion-shifted fiber, or other types of transmission fibers.

Temperature detection sensors 60 and 61 detect the temperatures of the first and second amplification stages 100 and 300, respectively. Preferably, the temperature detection sensors 60 and 61 detect the temperatures of the first and second EDFs 40 and 41, respectively. The control means 70 controls the intensity of the pumping light of at least one of the LDs 31 and 32 to control the Raman gain of the DCF 50 according to the detected temperatures. That is, the intensity of the output pumping light is controlled by controlling the driving circuit of the LDs 31 and 32 according to the detected temperatures and, accordingly, the Raman gain in the DCF 50 is changed. As a result, by controlling the magnitude and slope of Raman gain in the DCF 50, the gain-spectrum tilts of the L-band DCHFA depending on the temperatures can be effectively suppressed to get a fairy flat gain spectrum over the L-band.

Although the temperature detection sensors 60 and 61 are illustrated as being provided in the amplification stages 100 and 300, respectively, a plurality of temperature detection sensors may be provided in each of the amplification stages 100 and 300. In this case, the control means 70 receives temperature values detected at various locations of each amplification stage, calculates the average temperature of each amplification stage, and controls the intensity of the pump LDs 31 and 32 according to the calculated average temperatures.

As described above, by controlling the magnitude and slope of gain in the DCF 50, the overall gain-spectrum tilt of the fiber amplifier can be maintained unchanged within a small error bound.

Figure 3:
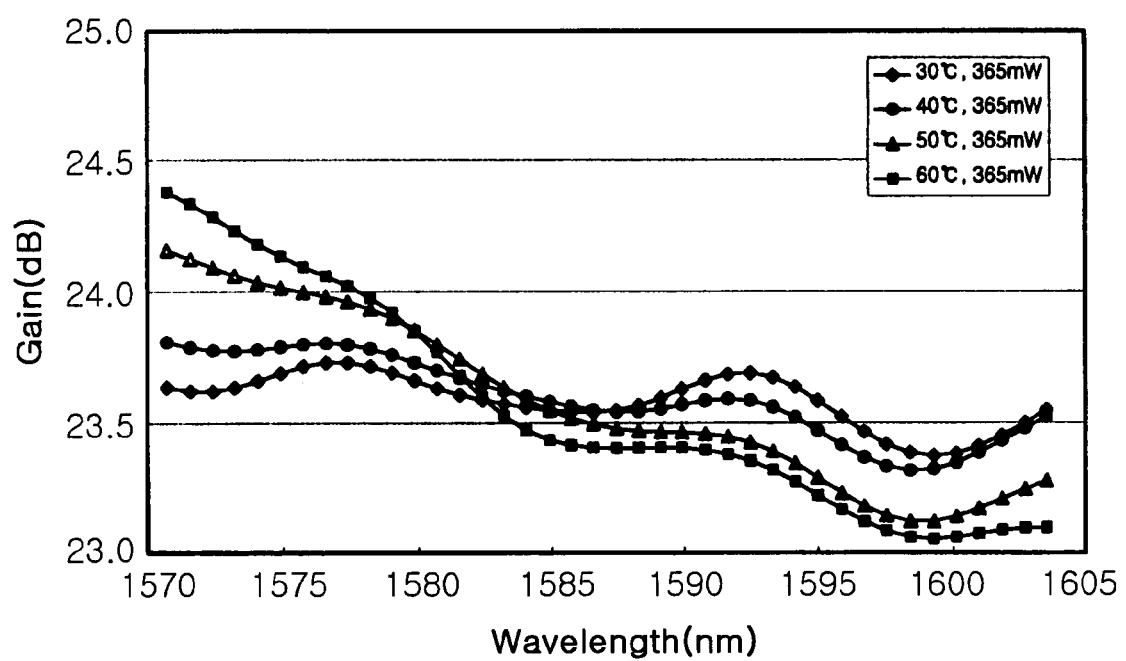
FIG. 3 is a graph showing the variation of gain spectrum according to the environmental temperature variation of the L-band DCHFA of the present invention.

FIG. 3 is a graph showing the variation of gain spectrum according to the temperature variation of the L-band DCHFA of the present invention, where the environmental temperature of the EDFs 40 and 41 is changed from 30 to 60° C. The pump powers from LDs 30 to 34 are kept constant during the measurement. In particular, the total pump power of the 1500-nm LDs 31 and 32 required for the Raman gain is maintained at 365 mW. For 30° C., the gain is flat within 0.5 dB over the wavelength band of 33 nm. As the temperature increases, the gains at the short wavelengths are increased and the gains at the long wavelengths are decreased. For 60° C., the gain variation becomes 1.4 dB. The tendency of the variation is the same as that of the conventional L-band EDFA shown in FIG. 1.

Figure 4:
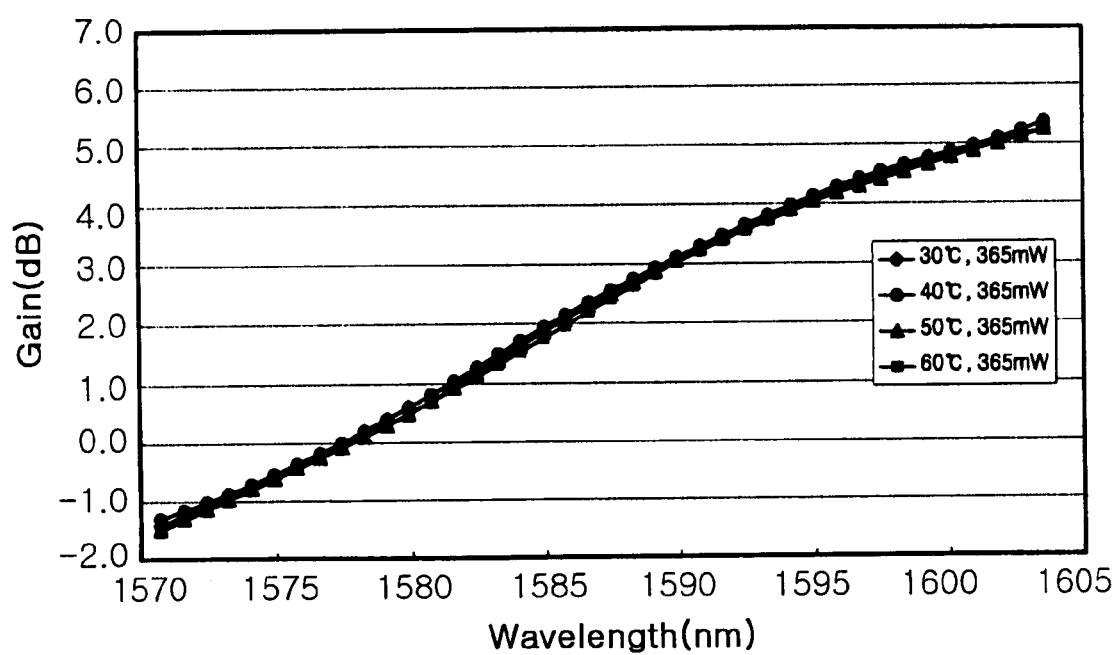
FIG. 4 is a graph illustrating the variation of the Raman gain in the DCF according to the environmental temperature variation of the L-band DCHFA of the present invention.

FIG. 4 is a graph illustrating the variation of Raman gain in the DCF according to the temperature variation of the L-band DCHFA of the present invention. Referring to FIG. 4, for the temperature range from 30° C. to 60° C., almost the same gain spectra are obtained. In this case, the total pump power of the 1500-nm LDs 31 and 32 is also maintained at 365 mW. Therefore, the variation of gain spectrum shown in FIG. 3 comes from the amplification stage of the EDF regardless of the Raman gain in the DCF 50.

Figure 5:
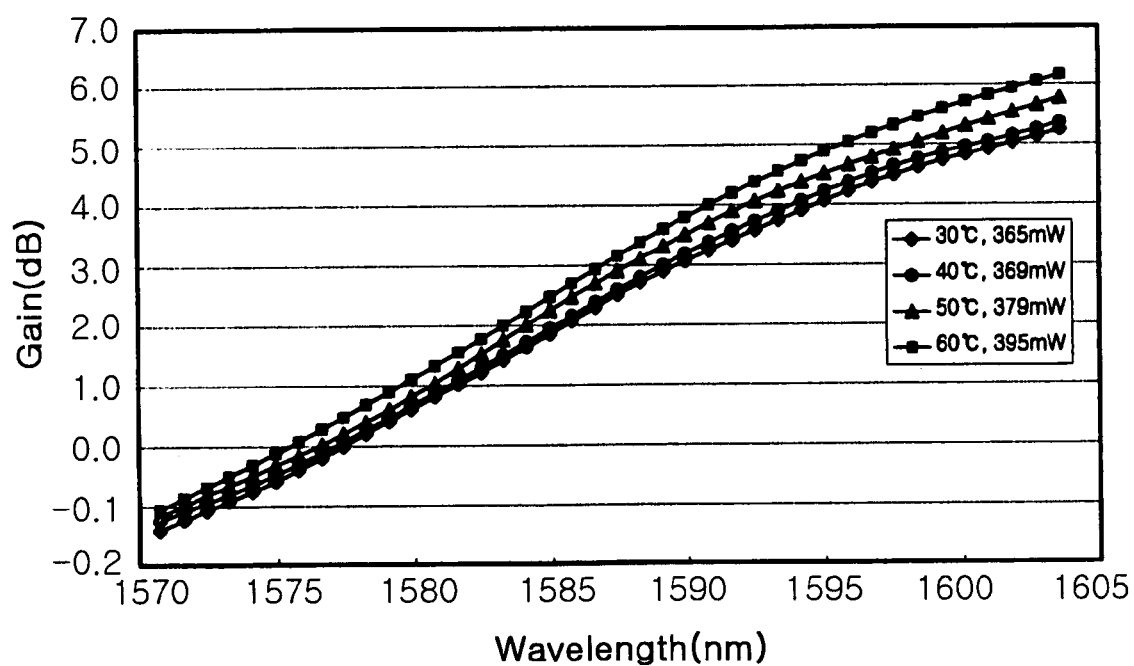
FIG. 5 is a graph illustrating the variation of the Raman gain when the intensity of the Raman pumping light is varied according to the environmental temperature variation of the L-band DCHFA of the present invention.

FIG. 5 is a graph illustrating the variation of Raman gain spectrum when the total optical power of the Raman pumps varies with the temperature of the L-band DCHFA of the present invention. The launching pump power to the DCF varies from 365 to 395 mW corresponding to the environmental temperature of from 30 to 60° C. The Raman gain is increased as a whole, but the increases are different for the signal wavelengths. That is, the increment is large on the 1605-nm wavelength side, while it is small on the 1570-nm wavelength side. Since this change is opposite to that of the entire DCHFA, the overall variation of the gain spectrum can be compensated by the present invention. The reason why the Raman gain of the DCF 50 has such a tendency according to the intensity of the Raman pumping light is that the Raman gain peak is in the vicinity of a wavelength of 1605 nm which is 105-nm apart from 1500-nm pump. For example, if the Raman pump of 1465 nm is used, the Raman gain peak is achieved in the vicinity of a wavelength of 1570 nm. If the intensity of the Raman pumping light is increased, the inclination of the variation of the gain spectrum similar to that in the EDFA due to the temperature variation will be achieved. Conversely, if the intensity of the Raman pumping light is decreased, the inclination of the variation of the gain spectrum opposite to that in the EDFA due to the temperature variation may be achieved, but the intensity of the signal inputted to the second amplification stage 300 is decreased.

This decrease of intensity of the signal input to the second amplification stage 300 induces the gain tilt similar to that from the temperature variation of the EDF 41 of the second amplification stage 300, and then it is impossible to compensate for the gain variation from the temperature changes. Therefore, the wavelength of the pumping light used to achieve Raman gain is preferably 1500±10 nm.

Figure 6:
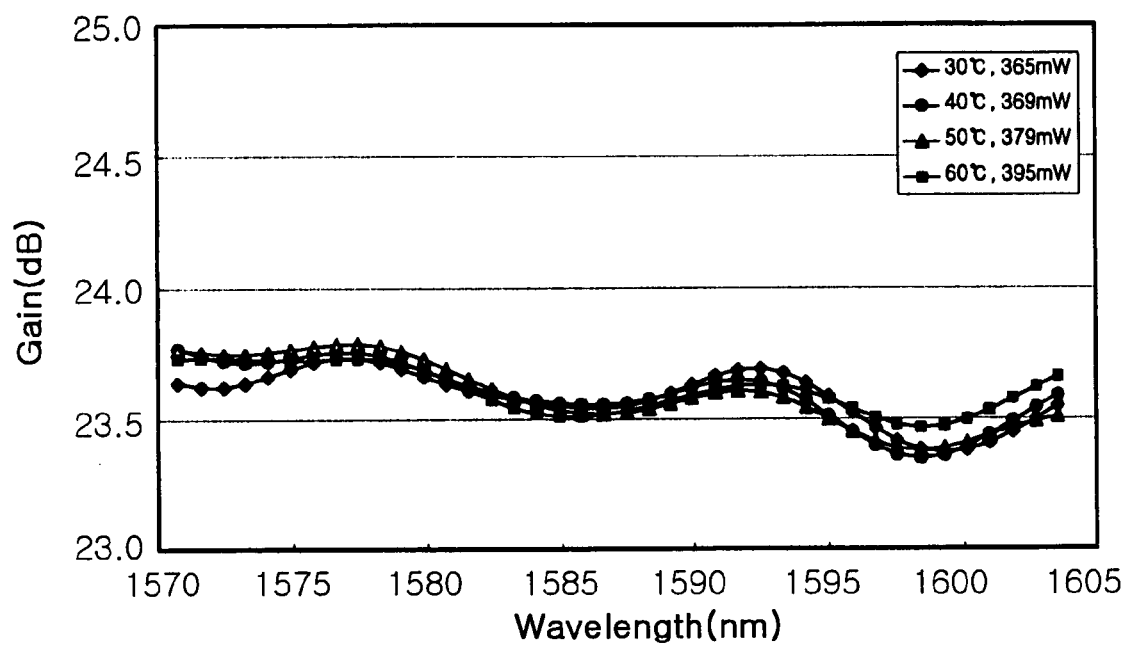
FIG. 6 is a graph illustrating the variation of gain spectrum of the overall L-band DCHFA when the intensity of the DCF pumping is varied according to the temperature variation of the L-band DCHFA of the present invention.

FIG. 6 is a graph illustrating the variation of gain spectrum of the whole L-band DCHFA when the intensity of the DCF pumping light varies with the temperature of the L-band DCHFA of the present invention. FIG. 6 illustrates the gain spectrum for the temperatures from 30° C. to 60° C., where the pump powers of the first and second stages 100 and 300 are kept constant and those of the Raman pumps to the DCF 50 varies from 365 to 395 mW. Referring to FIG. 6, there is no variation of gain spectrum attributable to the variation of temperature.

Figure 7:
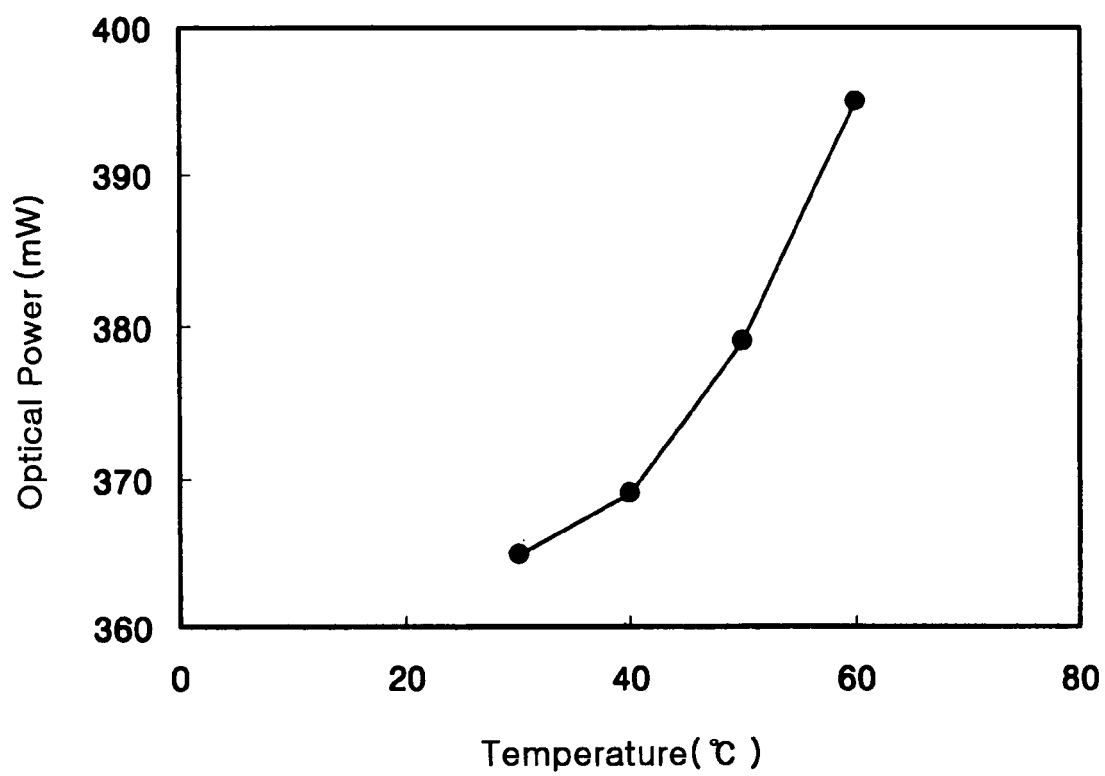
FIG. 7 is a graph showing a relationship between the environmental temperature and the intensity of the light of a DCF pumping LD.

FIG. 7 is a graph showing a relationship between the temperature and the optical power of Raman pump LD. In this drawing, there are shown the optical power of the Raman pump LD that is required to maintain the gain spectrum of the L-band DCHFA according to the temperature change. From FIG. 7, it can be appreciated that the gain-tilt compensation can be achieved by measuring and storing the appropriate pump powers with various temperatures in advance, and driving the Raman pump LDs according to the measured and stored data.

Figure 8:
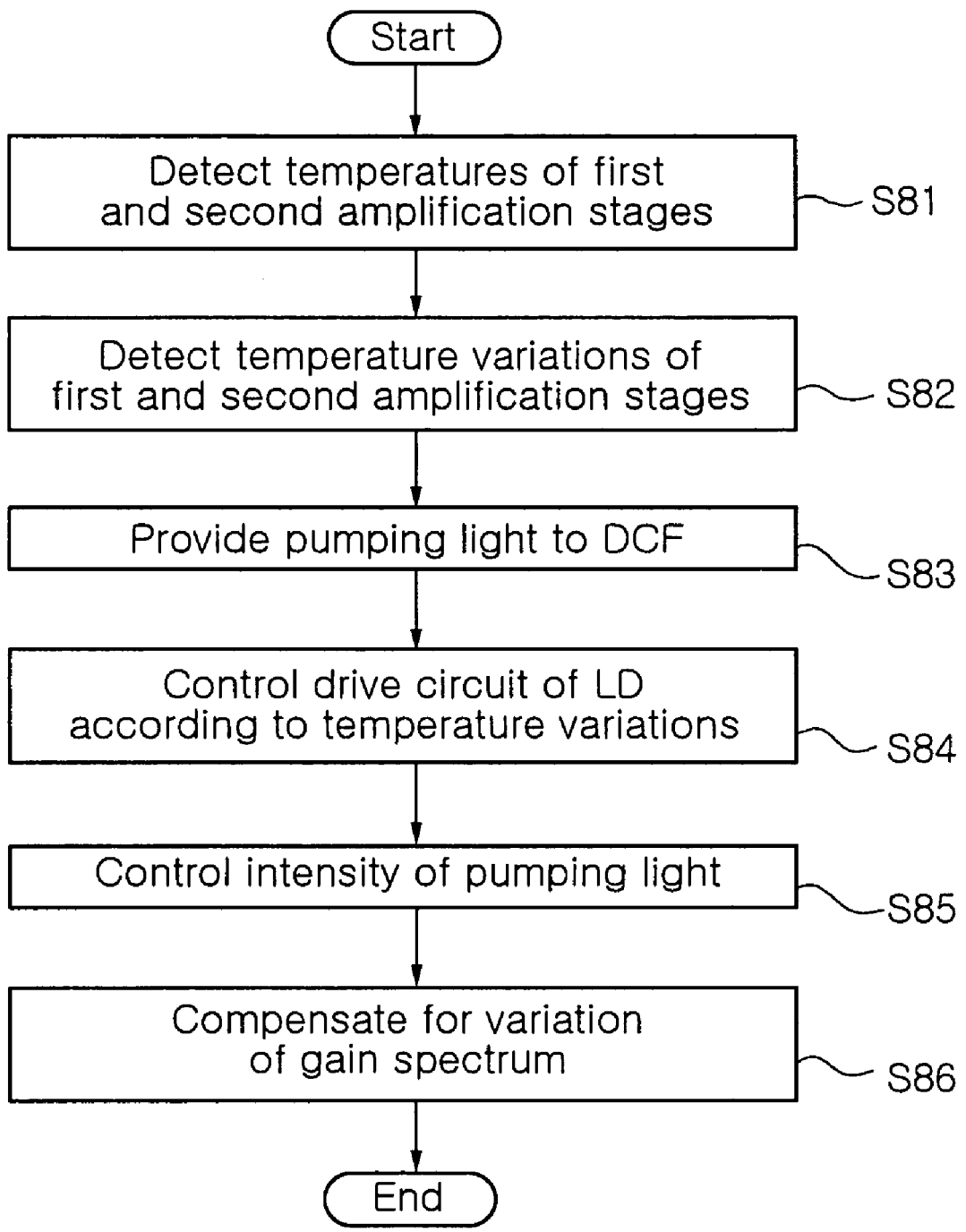
FIG. 8 is a flowchart showing a process of compensating for the variation of the gain spectrum due to the temperature variation of the optical fiber amplifier of the present invention.

FIG. 8 is a flowchart showing a process of compensating for the variation of the gain spectrum attributable to the temperature variation of the fiber amplifier of the present invention. As described above, the fiber amplifier to which the method of the present invention is applied has a two-stage structure, and is preferably the L-band DCHFA with the two-stage structure shown in FIG. 2. With reference to the DCHFA of FIG. 2 according to the preferred embodiment of the present invention, the method of compensating for the variation of a gain spectrum attributable to the temperature variation of the fiber amplifier is described below.

The fiber amplifier to which the gain spectrum compensating method of the present invention is applied has a two-stage structure. The temperatures of the first amplification stage 100 and the second stage 300 are detected at step S81. In this case, the detection of temperature may be performed at various locations of each stage. Additionally, the average temperature of each stage is calculated using the temperature values detected at the various locations, and it is used as the detected temperature of each amplification stage 100 or 300. Subsequently, the temperature variation of each amplification stage 100 or 300 is detected at step S82.

Forward or backward pumping light is provided from at least one of the LDs 31 and 32 to the DCF 50 of the optical fiber amplifier at step S83. The DCF 50 compensates for the dispersion of the optical signal amplified in the first amplification stage 100 and performs the amplification of the input optical signal through Raman amplification using the provided pumping light.

Subsequently, the driving circuits of the LDs 31 and 32 are controlled according to the temperature variations of the first and second amplification stages 100 and 200 detected at step S84 and, thus, the intensity of pumping light provided by the LDs 31 and 32 is controlled at step S85. That is, the intensity of the pumping light provided to the DCF 50 is controlled according to the temperature variations of the first and second amplification stages 31 and 32. The reason for this is that the intensity of the pumping light needs to be controlled according to the temperature variations so that the Raman amplification in the DCF 50 is controlled accordingly because the overall gain spectrum is varied according to the temperature variations in the fiber amplifier as described above. As a result, by controlling the intensity of the pumping light according to the temperature variations, the variation of the gain spectrum of the fiber amplifier is compensated. At the same step, the degree of polarization of the pumping light provided to the DCF 50 is reduced. This reduces the pump-polarization dependence of the Raman amplification in the DCF 50, so that the uniform Raman amplification can be performed regardless of the pump polarization. As described above, the variation of the overall gain spectrum of the fiber amplifier is compensated at step S86. The pumping light preferably has a wavelength of 1500±10 nm.

As described above, in the present invention, the gain-spectrum-tilt of the L-band DCHFA due to the temperature variation is compensated by selecting the appropriate wavelength and intensity of Raman pumping light, which causes the slope of Raman gain to be oppositely produced with respect to the variation of gain attributable to the temperature variation, thus compensating for the variation of gain spectrum attributable to the temperature variation.

Meanwhile, although the gain-tilt compensating apparatus applied to the L-band DCHFA has been described in the above-described embodiment, the gain-spectrum-tilt compensating apparatus of the present invention is not applied only to the fiber amplifier, but may be modified without departing from the spirit of the present invention. Furthermore, although the gain spectra are illustrated as being uniform and flat in the specified temperature range from 30 to 60° C. in FIGS. 3 to 7, the variation of gain can also be compensated in ranges from 0 to 30° C. and higher than 70° C. according to the same principle. This scheme can be implemented by detecting the temperature of amplification modules by temperature sensors and using a computer program for controlling the intensity of the light of the Raman pumping LD, without additional parts or circuits.

As described above, the present invention provides the simple and effective gain-spectrum-tilt compensating apparatus that compensates for the variation of the gain spectrum attributable to the temperature variation of the L-band DCHFA by controlling only the intensity of the light of the Raman pumping LD.

Furthermore, since the present invention can be implemented by detecting the temperature of amplification modules by temperature sensors and using a computer program for controlling the intensity of the light of the Raman pumping LD, without additional parts or circuits, the present invention is easy to implement, and the apparatus and DCHFA of the present invention can be miniaturized, and the apparatus of the present invention is inexpensive and effective.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for compensating for the gain-spectrum-tilt due to a temperature change of a fiber amplifier with a two-stage structure, comprising:
   a dispersion-compensating fiber (DCF) located between a first amplification stage and a second amplification stage to compensate for dispersion of an optical signal output from the first amplification stage and perform Raman amplification of the optical signal using input pumping light;

at least one pumping light provision means for providing forward or backward pumping light to the DCF;

first and second temperature detection means for detecting temperature variations of the first and second amplification stages, respectively; and control means for controlling intensity of the pumping light of the pumping light provision means according to the detected temperature variations;

wherein the gain-spectrum-tilt of the fiber amplifier is compensated for by controlling the intensity of the pumping light.

2. The apparatus according to claim 1, further comprising at least one depolarization means for reducing the degree of polarization of the pumping light provided by the pumping light provision means.

3. The apparatus according to claim 2, wherein the depolarization means is a polarization-beam combiner or a fiber-type depolarizer.

4. The apparatus according to claim 1, wherein the pumping light provision means comprises a plurality of pumping light provision means, and the plurality of pumping light provision means provide a plurality of rays of pumping light to boost up the total pump power.

5. The apparatus according to claim 1, wherein the Raman amplification in the DCF is controlled according to the intensity of the pumping light.

6. The apparatus according to claim 1, wherein the input optical signal has a wavelength band of 1570 to 1605 nm.

7. The apparatus according to any of claims 1 to 6, wherein the pumping light has a wavelength of 1500±10 nm.

8. The apparatus according to claim 1, wherein the DCF compensates for dispersion of a single mode optical fiber, a non-zero dispersion shifted fiber, or other types of transmission fiber.

9. A method for compensating for the gain-spectrum-tilt due to a temperature change of a fiber amplifier with a two-stage structure, comprising the steps of:

detecting the temperatures of a first amplification stage and a second amplification stage;

controlling intensity of pumping light input to a DCF located between the first and second amplification stages according to temperature variations of the first and second amplification stages; and controlling Raman gain of the DCF using the pumping light with intensity thereof controlled.

10. The method according to claim 9, wherein the step of detecting the temperature is performed by detecting temperature at a plurality of locations of each of the first and second amplification stages.

11. The method according to claim 9, wherein the DCF compensates for dispersion of an optical signal output from the first amplification stage and performs Raman amplification of an input optical signal.

12. The method according to claim 11, wherein the input optical signal has a wavelength band of 1570 to 1605 nm.

13. The method according to claim 9, wherein the step of controlling the Raman gain comprises the step of providing at least one of forward or backward pumping light.

14. The method according to claim 9, wherein the step of controlling the intensity of the pumping light comprises the step of reducing the degree of polarization of two or more pumping light inputted to the DCF.

15. The method according to any of claims 9, 13 and 14, wherein the pumping light has a wavelength of 1500±10 nm.

16. A Long-wavelength band (L-band) dispersion-compensating hybrid fiber amplifier (DCHFA), comprising:

a first amplification stage for first amplifying an input optical signal using first pumping light;

dispersion-compensating Raman amplification means for compensating for dispersion of first amplified optical signal output from the first amplification stage and performing Raman amplification of the first amplified optical signal using second pumping signal;

a second amplification stage for second amplifying an optical signal output from the dispersion-compensating Raman amplification means using third pumping light;

first and second temperature detection means for detecting temperature variations of the first and second stages, respectively; and control means for controlling intensity of the second pumping light according to the detected temperature variations of the first and second amplification stages;

wherein a gain-spectrum-tilt of a fiber amplifier attributable to a change of temperature is compensated by controlling the intensity of the pumping light.

17. The L-band DCFHA according to claim 16, wherein the first amplification stage comprises a first erbium-doped fiber (EDF) for first amplifying the input optical signal using the first pumping signal, the second amplification stage comprises a second EDF for second amplifying the optical signal output from the dispersion-compensating Raman amplification means using the third pumping light, and the first EDF obtains gain equal to or greater than 8 dB over the whole wavelength band of 1570 to 1605 nm.

* * * * *